US006209491B1

(12) United States Patent
Olson

(10) Patent No.: US 6,209,491 B1
(45) Date of Patent: Apr. 3, 2001

(54) PET ENTERTAINMENT APPARATUS

(76) Inventor: Jim Olson, 316 S. Rammer, Arlington Heights, IL (US) 60004

( * ) Notice: Subject to any disclaimer, the term of this patent is extended or adjusted under 35 U.S.C. 154(b) by 0 days.

(21) Appl. No.: 09/322,825

(22) Filed: May 28, 1999

(51) Int. Cl.$^7$ ................................................ A01K 15/02
(52) U.S. Cl. ............................................ 119/706; 119/702
(58) Field of Search .................................. 119/702, 706, 119/453, 482, 751; 47/28.1, 30; D30/109; 135/90, 97; 482/35, 36; 5/424, 425; 248/345.1; 297/452.1

(56) References Cited

U.S. PATENT DOCUMENTS

| | | | |
|---|---|---|---|
| 1,003,370 | * | 9/1911 | Priest ...................................... 47/28.1 |
| 3,989,008 | * | 11/1976 | Neumann ............................ 119/28.5 |
| 4,253,423 | * | 3/1981 | Kaplan .................................. 119/706 |
| 4,576,116 | * | 3/1986 | Binkert ................................. 119/498 |
| 4,793,286 | * | 12/1988 | Buxton ................................. 119/498 |
| 5,000,116 | * | 3/1991 | Fife et al. ............................ 119/28.5 |
| 5,069,623 | * | 12/1991 | Peat ...................................... 434/260 |
| 5,080,042 | * | 1/1992 | Rubin ...................................... 119/29 |
| 5,113,793 | * | 5/1992 | Leader et al. ......................... 119/453 |
| 5,184,568 | * | 2/1993 | Healey .................................... 119/19 |
| 5,537,952 | * | 7/1996 | Devlin .................................. 119/28.5 |
| 5,577,465 | * | 11/1996 | Cook .................................... 119/498 |
| 5,620,396 | * | 4/1997 | Westphal .............................. 482/35 |
| 5,664,596 | * | 9/1997 | Zheng .................................. 135/126 |

FOREIGN PATENT DOCUMENTS

| | | | |
|---|---|---|---|
| 818543 | * | 8/1959 | (GB) ................................... 119/482 |
| 2227401 | * | 8/1990 | (GB) . |
| 8-308417 | * | 11/1996 | (JP) . |
| 98/19521 | * | 5/1998 | (WO) . |

* cited by examiner

Primary Examiner—Peter M. Poon
Assistant Examiner—Son T. Nguyen
(74) Attorney, Agent, or Firm—Kajane McManus

(57) ABSTRACT

The pet entertainment apparatus comprises an open three dimensional framework which is covered with releasably secured material configured to provide a hammock within a top of the apparatus and an interior compartment covered by swingable flaps which depend from the top in areas between rope covered upstanding legs which elevate the top above a base of the apparatus.

12 Claims, 3 Drawing Sheets

PET ENTERTAINMENT APPARATUS

BACKGROUND OF THE INVENTION

1. Field of the Invention

The present invention relates to a pet entertainment apparatus. More particularly, the pet entertainment apparatus is directed primarily to the entertainment of a cat.

2. Prior Art

Numerous structures have been proposed for entertaining cats. One is a cat condo providing numerous tiered hiding and resting areas. Another is a window bench upon which a cat can nap. Needless to say, the list may be extended ad infinitum.

However, each such structure seems to have a drawback: the covering upon which the cat lies, and therefore sheds hair and dander, cannot be easily disengaged from the base thereof for washing or replacement.

Further, there is not believed to exist a similar configuration offering the combined forms of entertainment provided by the structure of the present invention.

SUMMARY OF THE INVENTION

According to the invention there is provided a pet entertainment apparatus comprising an open framework including a base, legs upstanding from the base, a top supported above the base by the legs, and a removable piece of material having a center portion which loosely overlies, and securely engages, the top to create a hammock within confines defined by the top of the framework and includes a plurality of depending flaps extending radially outwardly of the center portion equal in number to the number of legs, with each flap extending across a space between adjacent legs.

DESCRIPTION OF THE PREFERRED EMBODIMENTS

Figure 1:
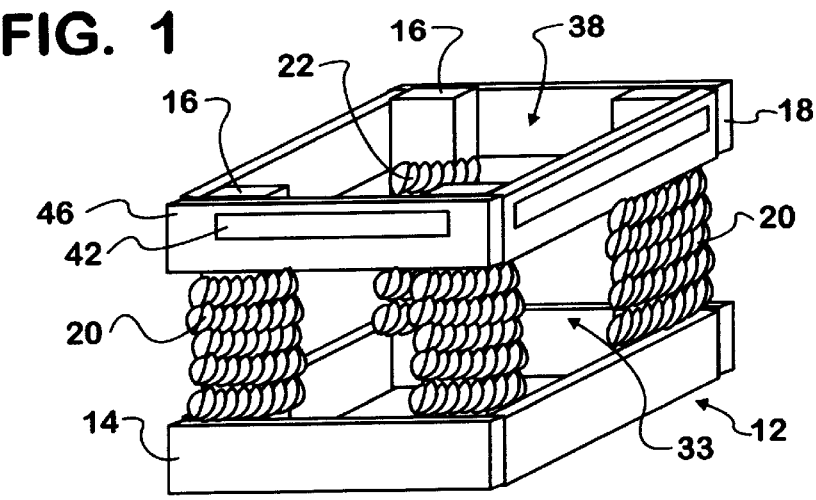
FIG. 1 is a perspective view of a first framework embodiment for the apparatus of the present invention.

Referring now to the drawings in greater detail, the pet entertainment apparatus of the present invention is generally referred to by the reference numeral 10.

Figure 2:
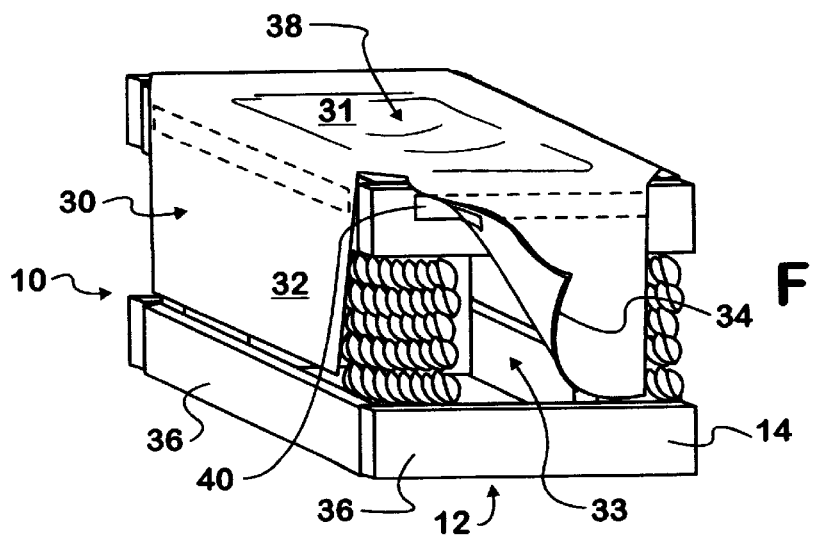
FIG. 2 is a perspective view of the framework of FIG. 1 showing a cloth section of the apparatus releasably secured over the framework.

As shown the apparatus 10 is comprised of two separate structures. The first structure may be defined as an open three dimensional framework 12, in the illustrated embodiment of FIGS. 1 and 2 having an open rectangular base 14, upstanding legs 16 at each corner of the base and an open rectangular top 18 supported above the base 14 by the legs 16.

Each leg 16 is covered with a material, such as rope 20 wound therearound for use by the pet when it desires to clean its claws (scratch). The rope 20 is attached in a manner to be replaceable when excessive wear has taken place; releasable securement being assured by use of tacks or like fasteners 22.

Figure 4:
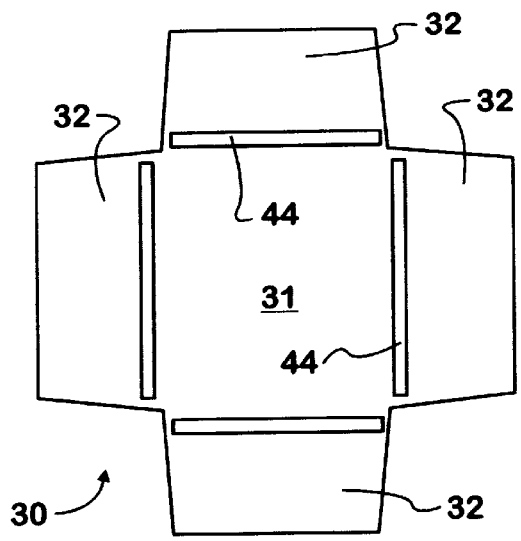
FIG. 4 is a bottom plan view of the piece of cloth of FIG. 2.

The second structure for this embodiment comprises a cross shaped section of material 30 illustrated in FIG. 4 which defines a center portion 31, which loosely overlies the top 18, the center portion 31, having a plurality flaps 32 extending radially outwardly therefrom.

Each flap is sized and configured to depend across and cover an open area 33 defined between adjacent legs 16, each flap 32 extending downwardly from the top 18 and having a free end 34 resting along a corresponding underlying base section 36.

As stated above, the center portion 31 of the material 30 is sized and configured to loosely overlie the top 18 of the framework 12, to create a hammock 31 for the pet within a space 38 defined by and within the open top 18, when securely engaged thereover.

Engagement between the center portion 31 of the material 30 and the top 18 of the framework 12 is created in any manner suitable for allowing simple removal of the material 30 for washing or replacement.

In the embodiment illustrated, cooperating hook and loop type fasteners 40 are illustrated, with a hook section 42 being engaged to one of the structures 18 or 31 and a loop section 44 being engaged to the other of the structures 31 or 18.

It will be understood that the fasteners 40 are engaged to the material 30 at such positions so as to allow for some slack in the loosely overlying center section 31 to produce the hammock 31. And, although the fasteners are shown engaged to lateral walls 46 of the top 18, this is not to be construed as limiting.

Further, it will be understood that the flaps 32 are configured as defined above to freely swing in and out between adjacent upright legs 16.

This free swinging capability of the flaps 32 creates an enclosure 48 within an interior 48 of the framework 12 into which a pet 50 may wander, with a flap 32 engaging alongside the pet's body trapping loose hairs thereon.

Further, when more than one pet 50 is present, a first pet 50 within the interior 48 may attack a second pet 50 walking by alongside the apparatus 10 by reaching out around the flaps 32, providing entertainment. Still further, because the upstanding legs 16 are encircled with removable rope 20, the pet may scratch the rope 20 from the interior 48 as well.

Figure 3:
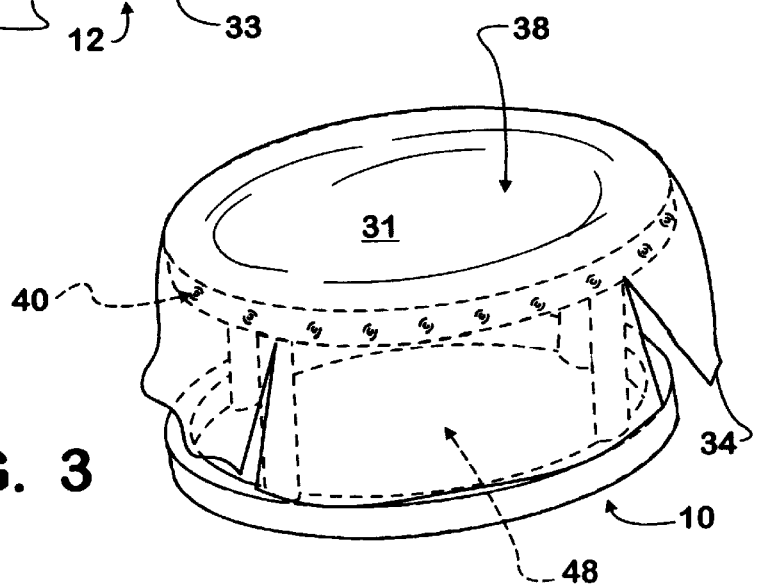
FIG. 3 is a perspective view of a further embodiment of the apparatus.
Figure 5:
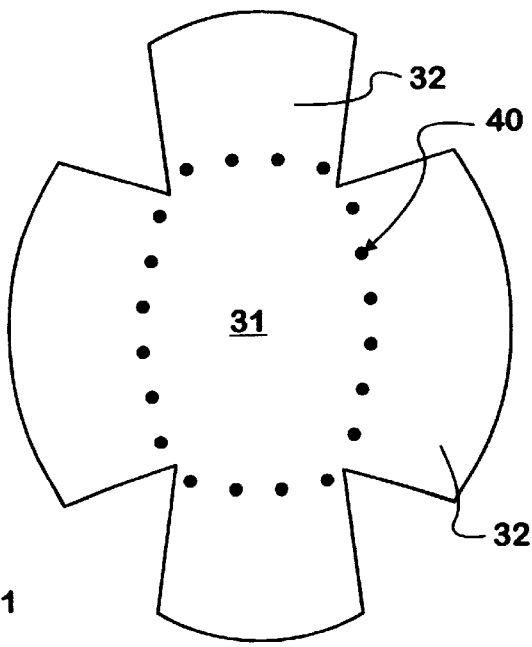
FIG. 5 is a bottom plan view of another embodiment of a piece of cloth suitable for use with an oval shaped framework.
Figure 6:
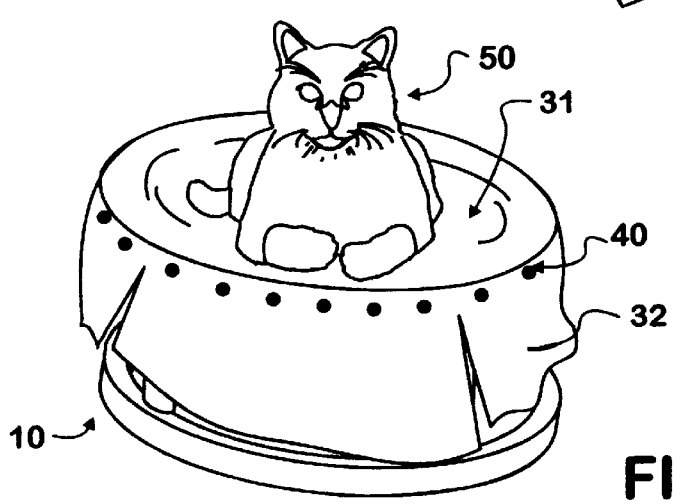
FIG. 6 is a perspective view of another embodiment of the apparatus using the piece of material of FIG. 5.

It will be understood that configuration of the apparatus 10 in rectangular form is only one option. As shown in FIG. 3, the apparatus 10 may be drum shaped, or as illustrated in FIGS. 5 and 6, the shape may be ovaled. Therefore, only the imagination becomes limiting.

Also, with respect to fasteners 40, the use of the hook and loop type has been found functional. However, as shown, snaps 40, or tacks 40, would also be accommodating for releasable engagement.

Figure 7:
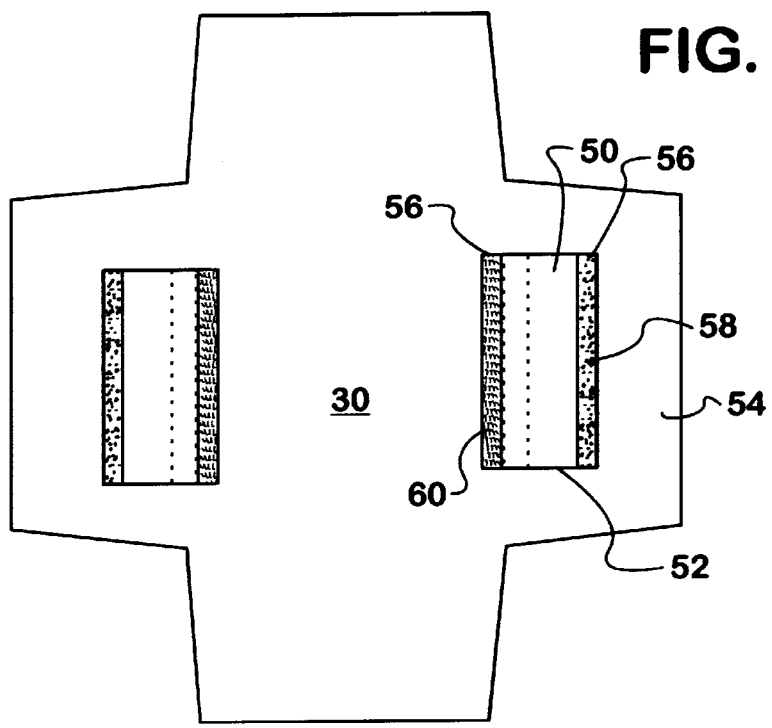
FIG. 7 is a bottom plan view of a piece of cloth showing a further embodiment of structure for use in engaging the cloth to the top.
Figure 8:
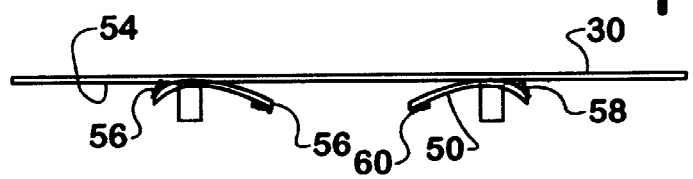
FIG. 8 is a side view of the cloth of FIG. 7.
Figure 9:
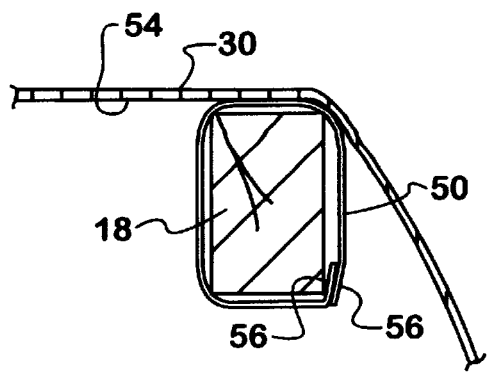
FIG. 9 is a perspective view showing the top engaging structure of the cloth releasably engaged about a section of the top.

Still further, as illustrated in FIGS. 7–9, another suitable structure for use as a fastener 40 may be in the form of a free ended strap 50 which is attached along a centered area 52 thereof to an underside 54 of the material 30 at appropriate positions, with each end 56 of the strap 50 being provided with cooperating fastening members 58 and 60. When the material 30 is positioned over the top 18, the ends 56 of each strap 50 are engaged about a portion of the top 18 and secured together by any suitable cooperating fastening members 58 and 60, releasably securing the material 30 to the framework 18.

As described above the apparatus 10 provides a number of advantages, some of which have been described above and others of which are inherent in the invention. Also, modifications may be proposed to the apparatus 10 without departing from the teachings herein. Accordingly the scope of the invention is only to be limited as necessitated by the accompanying claims.

I claim:

1. A pet entertainment apparatus comprising an open framework including a base, a plurality of legs upstanding from the base, an open top supported above the base by the legs, and a removable piece of material having a center portion which loosely overlies and securely engages the top to create a hammock within a space defined by and within the open top of the framework and including a plurality of radial depending flaps equal in number to the number of legs, each flap extending across a space between adjacent legs, wherein each of the plurality of legs is covered with a rope releasably wound therearound.

2. The apparatus of claim 1 wherein the base and top are identical rectangles, each having four corners.

3. The apparatus of claim 2 wherein one leg is engaged at each corner.

4. The apparatus of claim 1 wherein the plurality of legs is four.

5. The apparatus of claim 1 wherein the piece of material is releasably engaged to the top of the framework.

6. The apparatus of claim 5 wherein a center portion of the piece of material is dimensioned to be larger than the top of the framework to loosely overlie same.

7. The apparatus of claim 1 wherein each flap is sized to swing freely between adjacent legs.

8. The apparatus of claim 7 wherein each flap covers an area between adjacent legs and between the top and the base of the framework.

9. The apparatus of claim 1 being drum shaped.

10. The apparatus of claim 9 having a plurality of legs equal in number to the flaps, each flap swinging freely between adjacent legs.

11. The apparatus of claim 1 being ovaled.

12. A pet entertainment apparatus comprising an open framework including a top elevated above a base by a plurality of upstanding rope covered legs, the framework being covered with material releasably engaged thereto, the material being configured to produce a hammock within an area defined within the top of the apparatus when securely engaged thereto and including radial flaps depending from the top, each flap covering an area between adjacent legs.

* * * * *